United States Patent
Kim

(10) Patent No.: US 8,241,781 B2
(45) Date of Patent: Aug. 14, 2012

(54) CYLINDER TYPE LITHIUM ION SECONDARY BATTERY

(75) Inventor: Cheolwoo Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 113 days.

(21) Appl. No.: 12/801,664

(22) Filed: Jun. 18, 2010

(65) Prior Publication Data

US 2011/0052973 A1    Mar. 3, 2011

(30) Foreign Application Priority Data

Sep. 2, 2009  (KR) .................. 10-2009-0082373

(51) Int. Cl.
*H01M 10/40* (2006.01)
*H01M 2/10* (2006.01)

(52) U.S. Cl. .......................... 429/164; 429/94
(58) Field of Classification Search .................. None
See application file for complete search history.

(56) References Cited

U.S. PATENT DOCUMENTS

| 2003/0148175 | A1 | 8/2003 | Iwanaga et al. |
| 2008/0241646 | A1 | 10/2008 | Sawa et al. |
| 2009/0226799 | A1 | 9/2009 | Yamashita et al. |
| 2011/0052973 | A1 * | 3/2011 | Kim ............................. 429/164 |

FOREIGN PATENT DOCUMENTS

| JP | 2003229177 | 8/2003 |
| JP | 2003229177 A | 8/2003 |
| KR | 1020010011900 A | 2/2001 |
| KR | 1020070034222 A | 3/2007 |
| KR | 1020070071243 A | 7/2007 |
| KR | 1020090105544 A | 10/2009 |

OTHER PUBLICATIONS

Korean Office Action issued by KIPO on Apr. 12, 2011 in corresponding Korean Patent Application No. 10-2009-0082373.
Korean Notice of Allowance issued on Dec. 29, 2011 in the corresponding Korean Patent Application No. KR2009-0082373.

* cited by examiner

*Primary Examiner* — John S Maples
(74) *Attorney, Agent, or Firm* — Robert E. Bushnell, Esq.

(57) ABSTRACT

Provided is a cylinder type lithium ion secondary battery capable of preventing an internal electrical short due to compression of a center pin in compression and collision. The cylinder type lithium ion secondary battery includes a cylindrical can, an electrode assembly housed in the cylindrical can, a center pin inserted into the electrode assembly, and a cap assembly sealing the cylindrical can. The center pin has a hollow inner space and a wall surrounding the inner space. Outer diameters of an upper portion and lower portion of the center pin are larger than an outer diameter of a central portion of the center pin. Therefore, an internal electrical short due to compression of the center pin can be prevented in compression and collision.

16 Claims, 7 Drawing Sheets

US 8,241,781 B2

CYLINDER TYPE LITHIUM ION SECONDARY BATTERY

This application makes reference to, incorporates the same herein, and claims all benefits accruing under 35 U.S.C. §119 from an application earlier filed in the Korean Intellectual Property Office on 2 Sep. 2009 and there duly assigned Serial No. 10-2009-0082373.

BACKGROUND OF THE INVENTION

1. Field of the Invention

An aspect of the present invention relates to a cylinder type lithium ion secondary battery.

2. Description of the Related Art

In general, lithium secondary batteries, which can be repeatedly recharged and can be made in a small size while having a large capacity, are widely used in advanced electronic devices because of various advantages, including a high operation voltage, a high energy density per unit weight, and so forth.

The lithium secondary batteries are largely classified as cylinder type secondary batteries and prismatic type secondary batteries. The cylinder type lithium secondary battery includes a cylindrical electrode assembly to which a center pin is coupled to the electrode assembly, a cylindrical can accommodating the electrode assembly, an electrolyte injected into the can to allow movement of lithium ions, and a cap assembly coupled to one side of the can to prevent leakage of the electrolyte and separation of the electrode assembly.

SUMMARY OF THE INVENTION

An aspect of the present invention provides a cylinder type lithium ion secondary battery capable of preventing an internal electrical short in compression and collision. These improved characteristics of the cylinder type lithium ion secondary battery are proved through compression and collision tests carried out to evaluate battery performance.

In accordance with an aspect of the present invention, there is provided a lithium ion secondary battery including a cylindrical can, an electrode assembly housed in the cylindrical can, a center pin inserted into the electrode assembly, and a cap assembly sealing the cylindrical can. The center pin has a hollow inner space and a wall surrounding the inner space. Outer diameters of an upper portion and a lower portion of the center pin are larger than an outer diameter of a central portion of the center pin.

The center pin may be formed such that a ratio of the outer diameter of the upper portion or the lower portion of the center pin to the outer diameter of the central portion of the center pin is in a range of about 1.2-1.5 to 1. Accordingly, the center pin may be formed such that the upper portion or the lower portion of the center pin is gradually tapered to the central portion of the center pin.

In addition, the center pin may be formed such that a thickness of the wall of the center pin is uniform through the upper portion to the lower portion of the center pin. and may include a plurality of throughholes penetrating the wall of the center pin.

Further, the center pin may be formed such that an inner diameter of the inner space of the center pin is uniform through the upper portion to the lower portion of the inner space of the center pin, and that thicknesses of the walls of the upper portion and lower portion of the center pin are larger than a thickness of the wall of the central portion of the center pin.

In addition, the center pin may have a slit cutting the wall of the center pin along a direction from the upper portion to the lower portion of the center pin. The upper portion and the lower portion of the center pin may be gradually tapered to the central portion of the center pin.

The outer diameter of the upper portion of the center pin may be substantially the same as the outer diameter of the lower portion of the center pin. As described above, according to the present invention, an internal electrical short due to compression of the center pin can be prevented in compression and collision tests carried out to evaluate safety performance of the battery.

According to the present invention, it is also possible to facilitate the release of gas generated due to internal combustion of the cylinder type lithium ion secondary battery.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
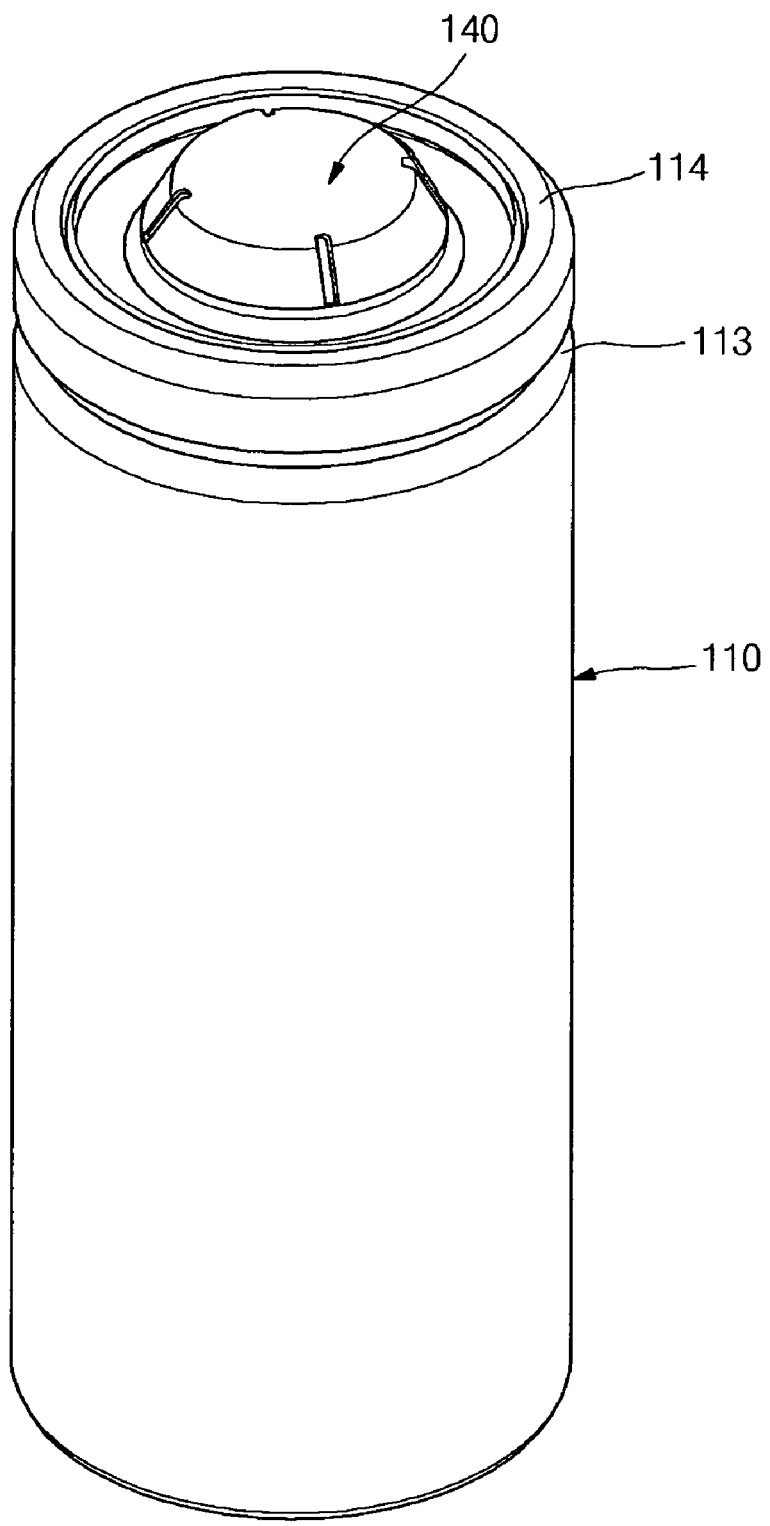
FIGS. 1A to 1D are a perspective view, a sectional view, an exploded perspective view and an enlarged sectional view illustrating a center pin of a cylinder type lithium ion secondary battery according an embodiment of the present invention, respectively.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

First, an embodiment for a center pin of a cylinder type lithium ion secondary battery according to the present invention will be described.

Figure 1B:
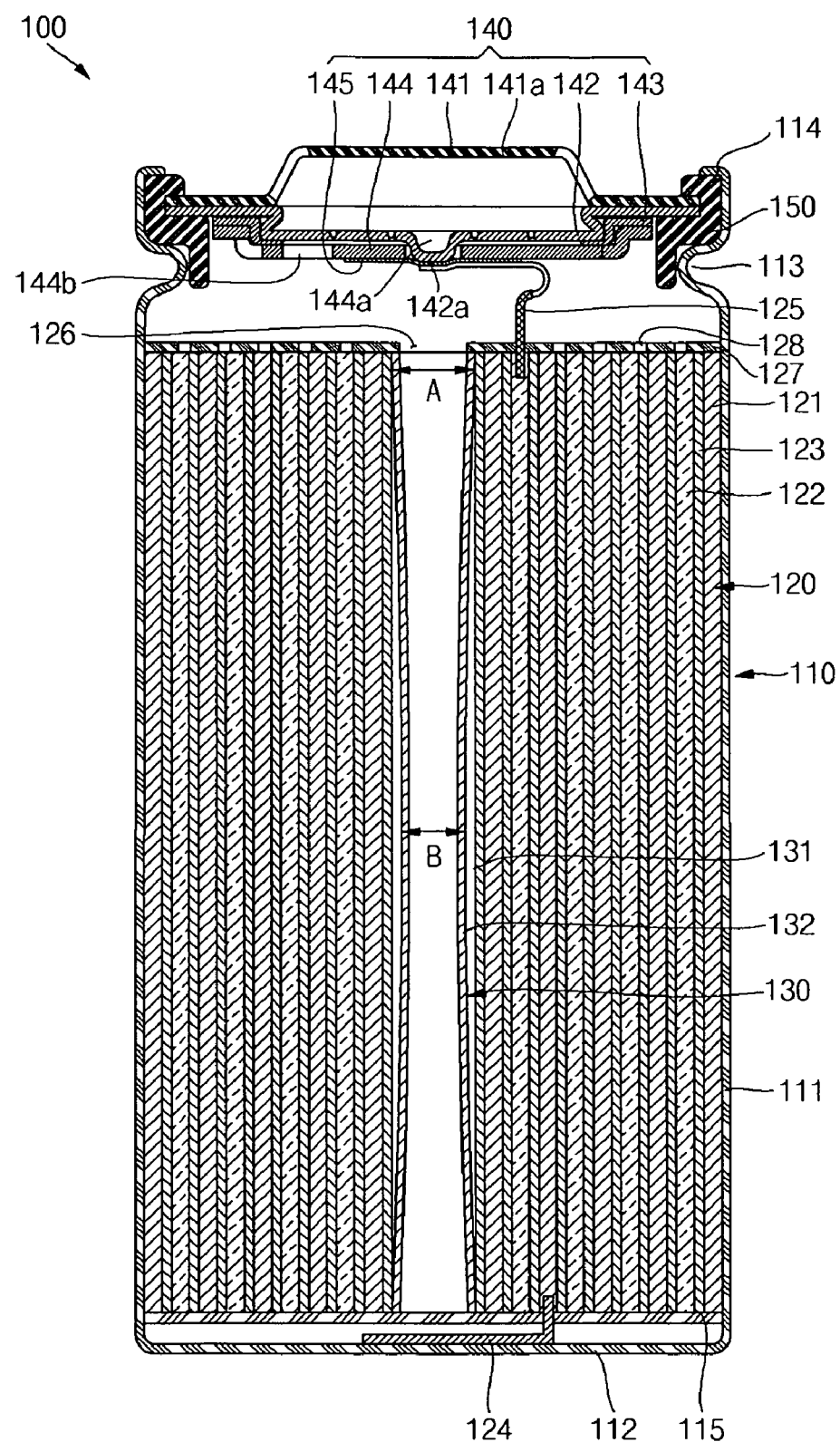
Figure 1C:
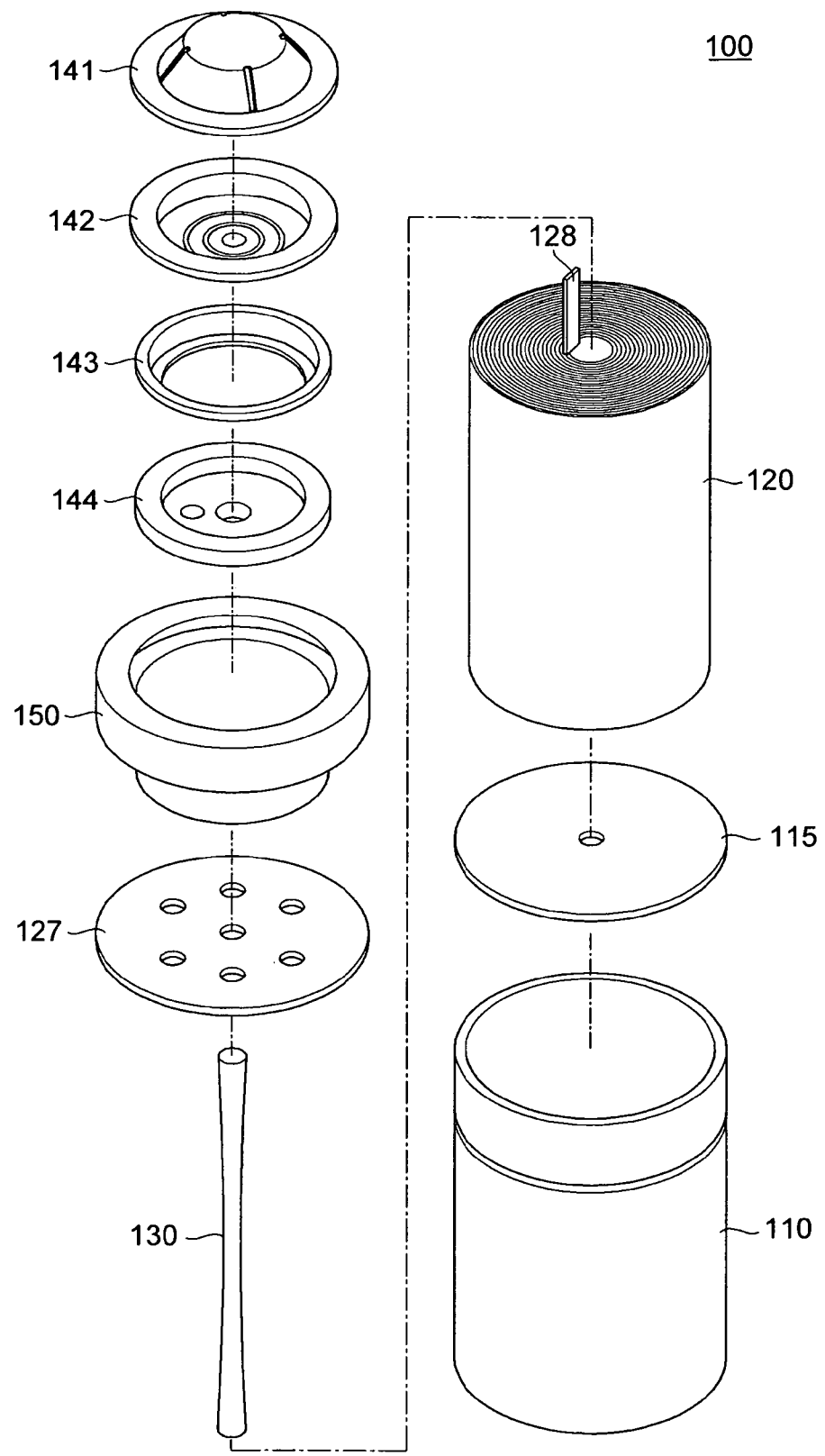

FIGS. 1A, 1B, and 1C are a perspective view, a sectional view, and an exploded perspective view illustrating a cylinder type lithium ion secondary battery according to the present invention, respectively.

As shown in FIGS. 1A to 1C, the cylinder type lithium ion secondary battery 100 according to the present invention include a can 110, an electrode assembly 120, a center pin 130, and a cap assembly 140.

The can 110 is formed substantially in the shape of a cylinder having a specific radius, and includes a cylindrical body 111, a bottom plate 112 formed at the bottom of the cylindrical body 111, which is substantially in a shape of a disk. Since the top of the can 110 is open, the electrode assembly 120 and the center pin 130 can be directly inserted into the can 110. The cylindrical can 110 may be made of steel, stainless steel, aluminum or the like, but aspects of the present invention are not limited thereto. A negative electrode tab 124 of the electrode assembly 120 may be welded to the bottom plate 112 of the cylindrical can 110. Accordingly, the cylindrical can 110 may function as a negative electrode. Alternatively, a positive electrode tab 125 of the electrode assembly 120 may be welded to the bottom plate 112 of the cylindrical can 110. In this case, the cylindrical can 110 may serve as a positive electrode.

A first insulating plate 115, which is coupled to the cylindrical can 110 and has a hollow formed at its center, is disposed at a lower part of the cylindrical can 110. The first insulating plate 115 is in contact with a bottom surface of the electrode assembly 120 to prevent an unnecessary electrical short between the electrode assembly 120 and the cylindrical can 110. In order to prevent the bottom surface of the electrode assembly 120 from being directly connected to the bottom surface of the cylindrical can 110, the first insulating plate 115 is formed at the bottom surface of the electrode assembly 120. The external shape of the first insulating plate 115 is a circular plate with a hollow formed at its center.

The electrode assembly 120 is inserted into the cylindrical can 110. The electrode assembly 120 includes a negative electrode plate 121 coated with a negative electrode active material, such as graphite, carbon, or the like, a positive electrode plate 122 coated with an positive electrode active material, such as a transition metal oxide, e.g., $LiCoO_2$, $LiNiO_2$ or $LiMn_2O_4$, and a separator 123 disposed between the negative electrode plate 121 and the positive electrode plate 122. The separator 123 prevents an electrical short between the negative electrode plate 121 and the positive electrode plate 122 while allowing for movement of lithium ions. The negative electrode plate 121, the positive electrode plate 122, and the separator 123 are stacked and wound together in a substantially cylindrical shape. Here, the negative electrode plate 121 may be made of a copper (Cu) foil, the positive electrode plate 122 may be made of an aluminum (Al) foil, and the separator 123 may be made of polyethylene (PE) or polypropylene (PP), but aspects of the present invention are not limited thereto.

In addition, a negative electrode tab 124 protruding downward by a given length may be welded to the negative electrode plate 121, and a positive electrode tab 125 protruding upward by a given length may be welded to the positive electrode plate 122. Alternatively, the negative electrode tab 124 protruding upward by a given length may be welded to the negative electrode plate 121, and a positive electrode tab 125 protruding downward by a given length may be welded to the positive electrode plate 122. Further, the negative electrode tab 124 may be made of nickel (Ni) and the positive electrode tab 125 may be made of aluminum (Al), but aspects of the present invention are not limited thereto.

The center pin 130 may have a hollow inner space and wall surrounding the hollow inner space. In this case, the wall of the center pin 130 includes a first surface 131 corresponding to an external surface of the center pin 130, and a second surface 132, which is opposite to the first surface 131 and faces the inner space. The center pin 130 is coupled approximately to the center of the electrode assembly 120.

The center pin 130 is substantially cylinder shaped to have a hollow inner space. The center pin 130 may be made of a metallic material such as aluminum or stainless steel, an insulating material such as polybutylene terephthalate (PBT), or the like, but aspects of the present invention are not limited thereto. Here, the center pin 130 minimizes deformation of the electrode assembly 120 during charging/discharging of a battery, providing for a path of gas released from the battery in an event of an internal disorder, such as internal combustion.

A second insulating plate 127 having a hollow 126 is disposed on the center pin 130. A plurality of electrolyte injection holes 128 are formed on the insulating plate 127. The electrolyte injection holes 128 serve as a path through which an electrolyte is injected into the electrode assembly 120. The second insulating plate 127 prevents the electrode assembly 120 from contacting the cap assembly 140. That is to say, in a case where the cylinder type lithium ion secondary battery 100 vibrates due to external impacts, the second insulating plate 127 also prevents the center pin 130 and the cap assembly 140 from contacting each other, so that deformation of the cap assembly 140 due to a contact between the center pin 130 and the cap assembly 140 can be avoided.

Figure 1D:
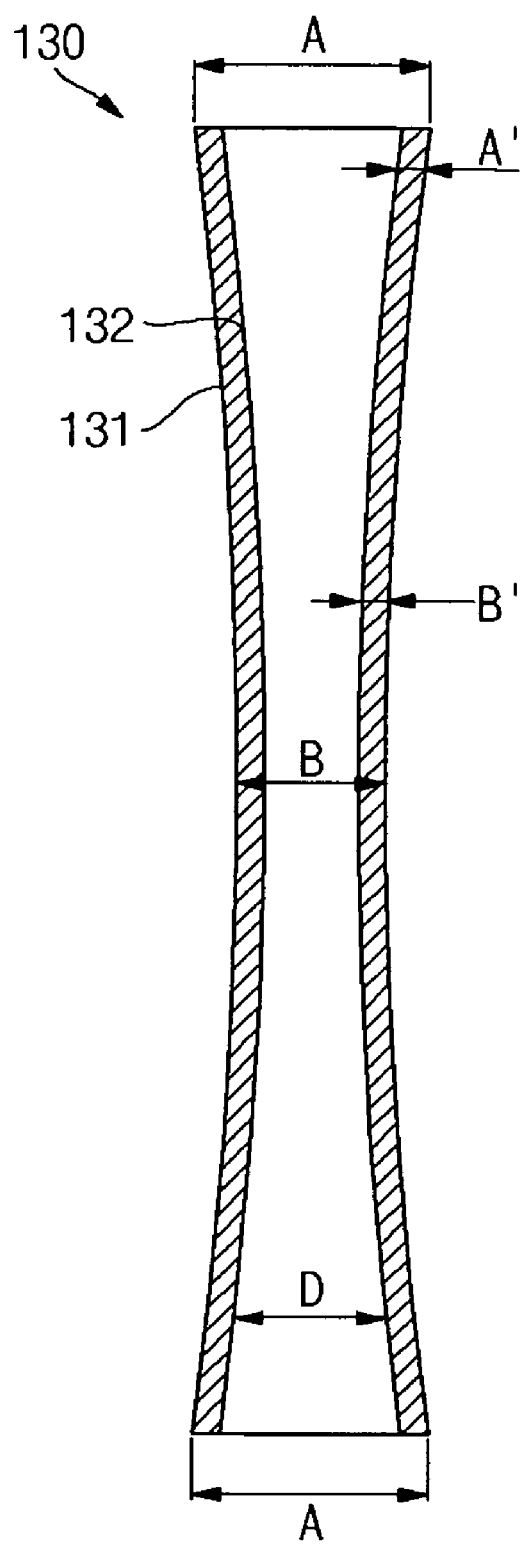

FIG. 1D is an enlarged sectional view illustrating the center pin of the cylinder type lithium ion secondary battery according to an embodiment of the present invention.

Referring to FIG. 1D, in the cylinder type lithium ion secondary battery 100 according to the present invention, an outer diameter A of an upper and lower portion of the center pin 130 (referred to as a upper outer diameter and a lower outer diameter, respectively) is larger than an outer diameter B of a central portion of the center pin 130 (referred to as a central outer diameter). Herein, an outer diameter of the center pin 130 is defined as a diameter along the first surface 131, while an inner diameter of the center pin 130 is defined as a diameter along the second surface 132 as marked by a reference character D in FIG. 1D.

The center pin 130 is formed such that a ratio of the outer diameter of the upper or lower portion of the center pin 130 to the outer diameter of the central portion of the center pin 130 is in a range of 1.2-1.5 to 1. For example, when the upper-, lower-end outer diameter A of the center pin 130 is between about 3 and about 3.5 (arbitrary unit), the central outer diameter B may be between about 2 and about 2.5 (arbitrary unit). If the upper and lower outer diameter A exceeds 1.5 times the central outer diameter B, the center pin 130 is vulnerable to external deformation, which can be induced during safety tests carried out to evaluate battery performance. Accordingly, it is quite difficult to maintain the exterior shape of the center pin 130 without deformation. On the other hand, if the upper and lower outer diameter A does not exceed 1.2 times the central outer diameter B, the upper and lower outer diameter A is substantially the same as the central outer diameter B, and advantages and effects of the present invention may not be properly achieved. That is to say, if the upper and lower outer diameter A of the center pin 130 is substantially the same as the central outer diameter B, an internal electrical short occurs, for example, in the safety tests such as compression and collision tests. In such a case, the gas generated during internal combustion may not be smoothly released from the battery, ultimately leading to poor performance of the battery.

Meanwhile, the wall of the center pin 130 may have a uniform thickness, which is defined by a distance through the wall between the first surface 131 and the second surface 132. In FIG. 1D, the thickness of the wall of the center pin 130 at an upper portion is marked by A', and the thickness of the wall of the center pin 130 at a central portion is marked by B'.

Because the outer diameters of the upper and lower portions of the center pin 130 are larger than the outer diameter of the central portion of the center pin 130, the upper portion or the lower portion of the center pin 130 is gradually tapered to the central portion of the center pin as shown in FIG. 1D.

Herein, the "gradually tapered" means that there is no sudden increase or decrease of the diameter while proceeding from the upper or lower portion to the central portion of the center pin 130.

The cap assembly 140 includes an upper cap 141, a safety vent 142 disposed under the upper cap 141, a lower cap 144 disposed under the safety vent 142, an insulator 143 interposed between the safety vent 142 and the lower cap 144, and a sub-plate 145 fixed to a bottom surface of the lower cap 144 and electrically connected to the positive electrode tab 125.

The safety vent 142 is shaped into a circular plate corresponding to the upper cap 141. The safety vent 142 has a protrusion 142a, which protrudes downward at the center of its central part, and a 'Z' shaped section at its peripheral portion. The safety vent 142 is electrically connected to the sub-plate 145 fixed on the bottom surface of the lower cap 144 through the protrusion 142a penetrating a throughhole 144a of the lower cap 144. The protrusion 142a of the safety vent 142 may be electrically connected to the sub-plate 145 by laser welding, resistance welding, or the like.

The safety vent 142 is constructed to tightly contact a peripheral portion of the upper cap 141, which excludes a protruding terminal portion 141a of the upper cap 141. When the internal pressure of the cylindrical can 110 abnormally increases, the safety vent 142 allows the gas generated due to an increase in the internal pressure to be exhausted by interrupting a current flow. When the internal pressure of the cylindrical can 110 exceeds the operation pressure of the safety vent 142, the protrusion 142a of the safety vent 142 moves upward due to the gas released through a gas release hole 144b of the lower cap 144, so that the safety vent 142 is electrically disconnected from the sub-plate 145.

As a welded portion of the protrusion 142a is split, the sub-plate 145 is electrically disconnected from the safety vent 142. When the internal pressure of the cylindrical can 110 exceeds a breakdown pressure of the safety vent 142, which is set to be higher than the operation pressure, the safety vent 142 is broken.

The insulator 143 is made of an insulating material and is interposed between the safety vent 142 and the lower cap 144 to insulate the safety vent 142 from the lower cap 144. The insulator 143 may be interposed between peripheral regions of the safety vent 142 and the lower cap 144.

The lower cap 144 is shaped into a circular plate. The throughhole 144a through which the protrusion 142a of the safety vent 142 penetrates is formed at the central part of the lower cap 144. The gas release hole 144b is formed at a side of the lower cap 144. The gas release hole 144b allows gas for moving the protrusion 142a of the safety vent 142 upward if the gas is exhausted when the internal pressure of the cylindrical can 110 is overly increased.

The sub-plate 145 is welded to the protrusion 142a of the safety vent 142 which penetrates the throughhole 144a of the lower cap 144. Accordingly, the positive electrode tab 114 and the safety vent 142 are electrically connected to each other through the sub-plate 145. The welding of the sub-plate 145 may be performed by laser welding, resistance welding, or the like.

A gasket 150 is disposed at the top opening of the cylindrical can 110. That is to say, the gasket 150 tightly assembles the outer circumference of the upper cap 141 and the safety vent 142 with the cylindrical can 110, thereby preventing the cap assembly 140 from being separated from the cylindrical can 110.

In order to secure the cap assembly 140 in the cylindrical can 110, the cylindrical can 110 may include a beading part 113 protruding toward inside of the can 110 and a crimping part 114 curved inward. The beading part 113 is formed below the cap assembly 140 and the crimping part 114 is formed above the cap assembly 140.

Further, an electrolyte (not shown) is injected into the cylindrical can 110 to allow movement of lithium ions generated by an electrochemical reaction between the negative electrode plate 121 and the positive electrode plate 122 of the battery during charging/discharging. Examples of the electrolyte may include, but not limited to, a non-aqueous organic electrolyte which is a mixture of a lithium salt and a high-purity organic solvent, a polymer using a polymer electrolyte, and so forth.

Next, a center pin of the cylinder type lithium ion secondary battery according to another embodiment of the present invention will be described.

Figure 2:
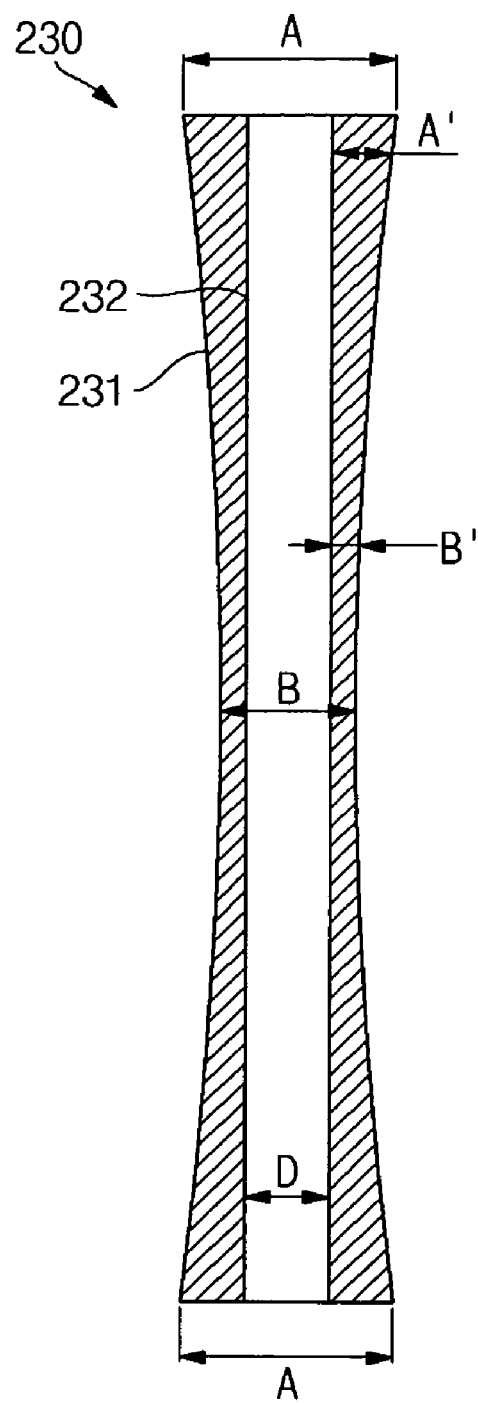
FIG. 2 is an enlarged sectional view illustrating a center pin of a cylinder type lithium ion secondary battery according to another embodiment of the present invention.

FIG. 2 is an enlarged sectional view illustrating a center pin of a cylinder type lithium ion secondary battery according to another embodiment of the present invention.

In the cylinder type lithium ion secondary battery 100 according to the present invention, as shown in FIG. 2, the center pin 230 includes a first surface 231, which is an outer surface of a wall of the center pin 230, and a second surface 232, which is an inner surface of the wall of the center pin 230. In this embodiment, an inner diameter D of the center pin 230 defined along second surface 232 is substantially the same through the upper portion to the lower portion of the center pin 230. The center pin 230 is constructed such that upper and lower wall thicknesses A' are larger than a central wall thickness B'. That is to say, the first surface 231 of the center pin 230 is formed to be curved while proceeding from the upper portion to the lower portion of the center pin 230, but the second surface 232 is formed to be straight while proceeding from the upper portion to the lower portion of the center pin 230. Accordingly, the upper and lower portions of the first surface 231 are gradually tapered to the central portion of the first surface 231, while the inner diameters of the upper and lower portion are substantially the same as the inner diameter of the central portion. With this configuration, internal deformation at the central portion of battery can be prevented.

The center pin 130 is coupled approximately to the center of the electrode assembly 120.

As shown in FIG. 1D, the center pin 230 is formed such that a ratio of the upper or lower outer diameter A to the central outer diameter B of the center pin 230 is in a range of 1.2-1.5 to 1. In this way, the ratio of the upper or lower outer diameter A to the central outer diameter B of the center pin 230 is specifically defined so as to fall within a certain range. The reason for this range has already been described above and a repeated explanation thereabout will not be given.

Figure 3A:
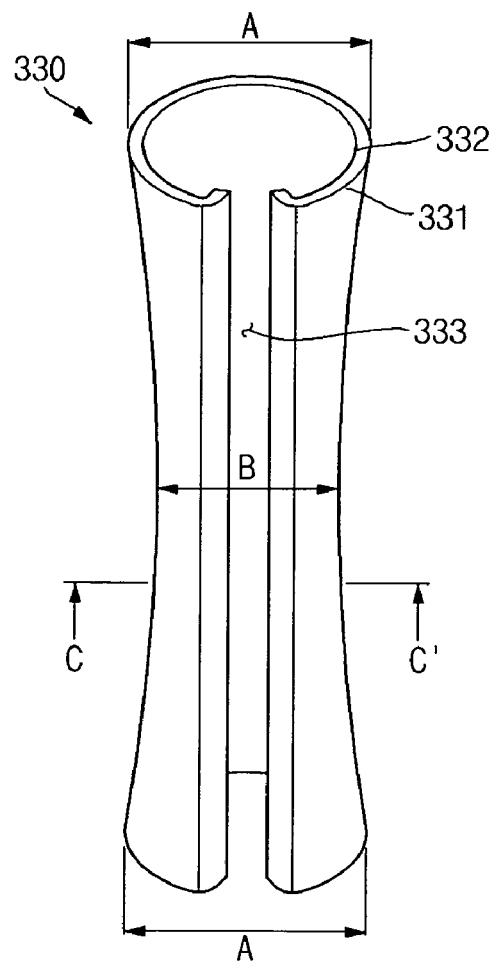
FIGS. 3A and 3B are an enlarged perspective view and a sectional view taken along the line C-C' illustrating a center pin of a cylinder type lithium ion secondary battery according to still another embodiment of the present invention.
Figure 3B:
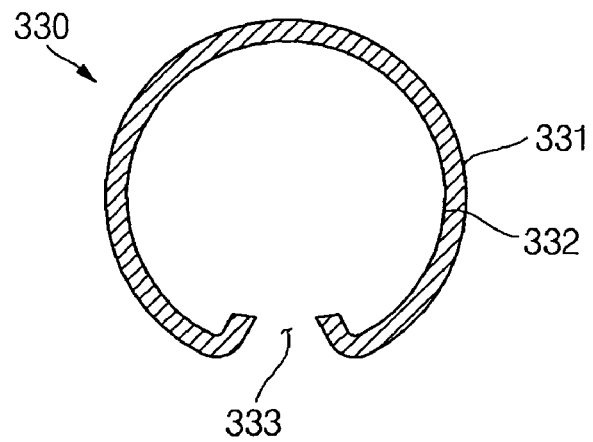

FIGS. 3A and 3B are an enlarged perspective view and a sectional view taken along the line C-C' illustrating a center pin of a cylinder type lithium ion secondary battery according to still another embodiment of the present invention.

As shown in FIG. 3A, the wall of the center pin 330 may have a slit 333 formed in a direction from the upper to lower portions of the center pin 330, which is referred to as a longitudinal direction. That is, the center pin 330 includes the slit 333 cut in the longitudinal direction.

The center pin 330 is formed such that a ratio of the upper or lower outer diameter A to the central outer diameter B is in a range of 1.2-1.5 to 1. In this way, the ratio of the upper and lower outer diameter A to the central outer diameter B of the center pin 330 is specifically defined so as to fall within a certain range. The reason for this range has already been described above and a repeated explanation thereabout will not be given.

The center pin 330 having a slit 333 will now be described in more detail with reference to FIG. 3B.

As shown in FIG. 3B, the slit 333 of the center pin 330 is formed by cutting a portion of the wall of the center pin 330. A thickness of the wall of the center pin 330, which is a distance between a first surface 331 and a second surface 332, may be uniform through the longitudinal direction of the center pin 330. Edges of the slit 333 are formed to be bent slightly inward with respect to the outer circumferential surface of the center pin 330. Accordingly, the edges of first surface 331 and the second surface 332, which form the slit 333, are bent inwardly with respect to the center pin 330. If the battery is deformed due to external impacts, an area of the slit-type center pin 330, which contacts an electrode plate, is reduced, suppressing an internal electrical short and heating and facilitating evacuation of internal gas to the exterior during battery combustion, thereby reducing damages caused to the battery.

Figure 4:
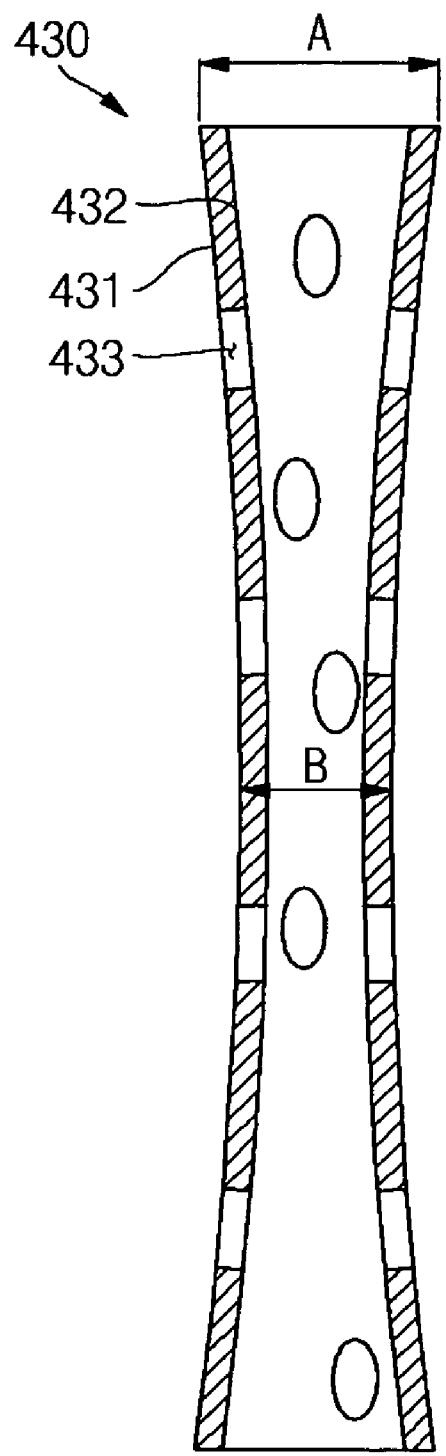
FIG. 4 is an enlarged sectional view illustrating a center pin of a cylinder type lithium ion secondary battery according to a further embodiment of the present invention.

FIG. 4 is an enlarged sectional view illustrating a center pin of a cylinder type lithium ion secondary battery according to a further embodiment of the present invention.

As shown in FIG. 4, the center pin 430 may include a plurality of throughholes 433 formed to penetrate through a first surface 431 and a second surface 432. The throughholes 433 may be distributed substantially uniformly throughout the wall of the center pin 430.

Here, the throughholes 433 are formed to penetrate through the wall of the center pin 430 along its wall thickness direction.

The throughholes 433 facilitate flow of an electrolyte and release of gas generated during battery combustion, thereby facilitating ion exchange in the cylinder type lithium ion secondary battery 100 and thus improving performance of the cylinder type lithium ion secondary battery 100.

The shapes of the throughholes 433 are not limited to circular shapes as shown in FIG. 4. For example, the throughholes 433 may be formed in a polygonal shape. By forming the center pin 430 in such a way, the internal electrical short occurring in a battery collision can be prevented and release of gas generated during battery combustion can be facilitated.

Although only the cylinder type lithium ion secondary battery according to the present invention has been illustrated in the above-described embodiments, the present invention is not limited to the illustrated embodiments and those of ordinary skill in the art will find the technical spirit of the present invention in a range in which various changes can be made without departing from the scope of the present invention as defined by the appended claims.

What is claimed is:

1. A lithium ion secondary battery, comprising:
a cylindrical can;
an electrode assembly housed in the cylindrical can;
a center pin inserted into the electrode assembly, the center pin having a hollow inner space and a wall surrounding the inner space, outer diameters of an upper portion and a lower portion of the center pin being larger than an outer diameter of a central portion of the center pin, a thickness of the wall of the upper portion of the center pin being larger than a thickness of the wall of the central portion of the center pin; and
a cap assembly sealing the cylindrical can.

2. The lithium ion secondary battery of claim 1, wherein a ratio of the outer diameter of the upper portion or the lower portion of the center pin to the outer diameter of the central portion of the center pin is in a range of about 1.2-1.5 to 1.

3. The lithium ion secondary battery of claim 1, wherein the upper portion or the lower portion of the center pin is gradually tapered to the central portion of the center pin.

4. The lithium ion secondary battery of claim 1, wherein the center pin includes a plurality of throughholes penetrating the wall of the center pin.

5. The lithium ion secondary battery of claim 1, wherein an inner diameter of the inner space of the center pin is uniform through the upper portion to the lower portion of the inner space of the center pin.

6. The lithium ion secondary battery of claim 1, wherein a thickness of the wall of the lower portion of the center pin is larger than the thickness of the wall of the central portion of the center pin.

7. The lithium ion secondary battery of claim 1, wherein the center pin has a slit cutting the wall of the center pin along a direction from the upper portion to the lower portion of the center pin.

8. The lithium ion secondary battery of claim 7, wherein the upper portion and the lower portion of the center pin are gradually tapered to the central portion of the center pin.

9. The lithium ion secondary battery of claim 1, wherein the outer diameter of the upper portion of the center pin is substantially the same as the outer diameter of the lower portion of the center pin.

10. A lithium ion secondary battery, comprising:
an electrode assembly for generating electricity;
a can for accommodating the electrode assembly;
a center pin inserted into the electrode assembly, the center pin having a hollow inner space and a wall surrounding the inner space, an outer diameter of an upper portion of the center pin being larger than an outer diameter of a central portion of the center pin, a thickness of the wall of the upper portion of the center pin being larger than a thickness of the wall of the central portion of the center pin; and
a cap assembly sealing the cylindrical can.

11. The lithium ion secondary battery of claim 10, wherein an outer diameter of a lower portion of the center pin is larger than the outer diameter of the central portion of the center pin.

12. The lithium ion secondary battery of claim 10, wherein a ratio of the outer diameter of the upper portion of the center pin to the outer diameter of the central portion of the center pin is in a range of about 1.2-1.5 to 1.

13. The lithium ion secondary battery of claim 10, wherein an inner diameter of the inner space of the center pin is uniform through the upper portion to a lower portion of the inner space of the center pin.

14. The lithium ion secondary battery of claim 10, wherein the center pin has a slit cutting the wall of the center pin along a direction from the upper portion to the lower portion of the center pin.

15. The lithium ion secondary battery of claim 10, wherein the center pin includes a plurality of throughholes penetrating the wall of the center pin.

16. The lithium ion secondary battery of claim 10, wherein the outer diameter of the upper portion of the center pin is substantially the same as an outer diameter of a lower portion of the center pin.

* * * * *